(12) United States Patent
Ungetheim et al.

(10) Patent No.: US 11,091,208 B1
(45) Date of Patent: *Aug. 17, 2021

(54) FENDER SKIRT FOR VEHICLE

(71) Applicant: Vantage Mobility International, LLC, Phoenix, AZ (US)

(72) Inventors: Steven Paul Ungetheim, Phoenix, AZ (US); Toby Allan Himmelberger, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,220

(22) Filed: Apr. 9, 2021

Related U.S. Application Data

(63) Continuation of application No. 17/173,495, filed on Feb. 11, 2021, now Pat. No. 11,014,615.

(51) Int. Cl.
*B62D 25/18* (2006.01)
*B62D 25/16* (2006.01)
*B62D 35/00* (2006.01)
*B62D 25/02* (2006.01)

(52) U.S. Cl.
CPC .......... *B62D 25/182* (2013.01); *B62D 25/02* (2013.01); *B62D 25/163* (2013.01); *B62D 25/18* (2013.01); *B62D 35/00* (2013.01)

(58) Field of Classification Search
CPC .... B62D 25/16; B62D 25/163; B62D 25/168; B62D 25/18; B62D 25/182; B62D 25/184; B62D 35/00
USPC .......................................... 280/849; 296/198
See application file for complete search history.

(56) References Cited

U.S. PATENT DOCUMENTS

| | | | |
|---|---|---|---|
| 2,202,904 A | 6/1940 | Fergueson | |
| 2,224,428 A | 12/1940 | Fergueson | |
| 2,238,948 A | 4/1941 | Schatzman | |
| 2,353,553 A | 7/1944 | Fergueson | |
| 2,966,367 A | 12/1960 | Schatzman | |
| 3,368,826 A | 2/1968 | Whitesell | |
| 7,458,595 B2 | 12/2008 | Bonnaud | |
| 11,014,615 B1 * | 5/2021 | Ungetheim | B62D 25/163 |
| 2011/0080019 A1 | 4/2011 | Castillo | |
| 2011/0304129 A1 | 12/2011 | Owens | |
| 2013/0096781 A1 | 4/2013 | Reichenbach et al. | |

* cited by examiner

*Primary Examiner* — Jason S Daniels
(74) *Attorney, Agent, or Firm* — Fennmore Craig, P.C.

(57) ABSTRACT

A fender skirt for a vehicle includes an inner member having at least one mounting lug extending therefrom. An outer member mounted to the inner member defines an arcuate upper edge having a curvature that substantially matches a curvature of at least a first upper portion of a wheel opening in the vehicle. The outer member also defines an arched lower edge.

15 Claims, 12 Drawing Sheets

FENDER SKIRT FOR VEHICLE

CROSS-REFERENCE TO RELATED APPLICATION

This application is a continuation of co-pending U.S. patent application Ser. No. 17/173,495, filed on Feb. 11, 2021, now U.S. Pat. No. 11,014,615, which is hereby incorporated herein by reference for all that it discloses.

TECHNICAL FIELD

The present invention relates to vehicle accessories in general and more particularly to fender skirt assemblies for use with mobility assist vehicles.

BACKGROUND

Mobility assist or wheelchair accessible vehicles are well-known in the art and are provided with mobility access systems, such as deployable lifts or ramps, to allow persons requiring wheelchairs or other types of mobility assist systems to readily enter the vehicles, either to drive the vehicles or to ride along. Many such vehicles have side-deploying lifts or ramps, meaning that the lifts or ramps extend and retract from the sides of the vehicles. In other vehicles, the lifts or ramps may be deployed from the rear.

Most mobility-assist or wheelchair accessible vehicles are converted from OEM (original equipment manufacturer) vehicles, commonly minivans, although other types of vehicles, such as sport utility vehicles (SUVs) and vans are also converted for such use. In many conversions, the body of the vehicle is raised or elevated with respect to the suspension to provide sufficient space for the mobility assist system, which is often mounted to a floor assembly. However, the raised vehicle body increases the distance or gap between the top portion of the tire/wheel assembly and the wheel opening provided in the body. Depending on the amount of lift provided, the increased gap exposes substantial portions of the wheel well and suspension assemblies that are normally hidden by the tire/wheel assembly.

SUMMARY OF THE INVENTION

One embodiment of a fender skirt for a vehicle may include an inner member having at least one mounting lug extending therefrom. An outer member mounted to the inner member defines an arcuate upper edge having a curvature that substantially matches a curvature of at least a first upper portion of a wheel opening in the vehicle. The outer member also defines an arched lower edge.

Also disclosed is a fender skirt that includes an inner member having a top portion that defines a stepped flange section and a bottom portion. A plurality of mounting lugs extend generally outwardly from the stepped flange section of the inner member. At least one of the plurality of mounting lugs is positioned to align with an existing mounting point on the vehicle. An outer member mounted to the inner member defines an arcuate upper portion that is shaped to substantially match a curvature of at least a first upper portion of a wheel opening in the vehicle. The outer member also defines an arched lower portion. The stepped flange section of the inner member and the outer member together define a cavity sized to receive a body panel flange that defines the wheel opening in the vehicle.

Also disclosed is an improvement to a vehicle having a body lift system that raises the body of the vehicle to an elevated position and increases exposed portions of respective left and right front and left and right rear wheel wells defined between respective left and right front and left and right rear wheel openings and respective left and right front and left and right rear road wheels of the vehicle. A left front fender skirt mounted to the left front wheel opening of the vehicle reduces the exposed portion of the left front wheel well of the vehicle and reduces an aerodynamic drag coefficient of the vehicle. A right front fender skirt mounted to the right front wheel opening of the vehicle reduces the exposed portion of the right front wheel well of the vehicle and reduces the aerodynamic drag coefficient. A left rear fender skirt mounted to the left rear wheel opening of the vehicle reduces the exposed portion of the left rear wheel well of the vehicle and reduces the aerodynamic drag coefficient. A right rear fender skirt mounted to the right rear wheel opening of the vehicle reduces the exposed portion of the right rear wheel well of the vehicle and reduces the aerodynamic drag coefficient of the vehicle.

Also disclosed is a method of mounting a fender skirt to a wheel opening of a vehicle that includes the steps of: Providing a fender skirt assembly that includes an inner member having a plurality of mounting lugs extending therefrom and an outer member attached to the inner member, the outer member defining an upper edge having a curvature that is about the same as a curvature of a first upper portion of the wheel opening of the vehicle; removing a plurality of wheel well fasteners from corresponding mounting points provided within the wheel well of the vehicle; positioning the fender skirt assembly adjacent the wheel well; aligning the mounting lugs on the fender skirt assembly with the mounting points; and installing fasteners to the corresponding mounting points, the fasteners securing the fender skirt assembly and wheel well within the wheel opening of the vehicle.

Also disclosed is a vehicle that includes a body lift system that raises the body of the vehicle to an elevated position and increases exposed portions of left and right front wheel wells defined between respective left and right front wheel openings of the vehicle and respective left and right road wheels. The body lift system also increases exposed portions of left and right rear wheel wells defined between respective left and right rear wheel openings of the vehicle and respective left and right rear road wheels of the vehicle. A left front fender skirt mounted to the left front wheel opening of the vehicle reduces the exposed portion of the left front wheel well and reducing an aerodynamic drag coefficient of the vehicle. A right front fender skirt mounted to the right front wheel opening of the vehicle reduces the exposed portion of the right front wheel well and further reduces the aerodynamic drag coefficient of the vehicle. A left rear fender skirt mounted to the left rear wheel opening of the vehicle reduces the exposed portion of the left rear wheel well and still yet further reduces the aerodynamic drag coefficient of the vehicle. A right rear fender skirt mounted to the right rear wheel opening of the vehicle reduces an exposed portion of the right rear wheel well and reduces the aerodynamic drag coefficient of the vehicle.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
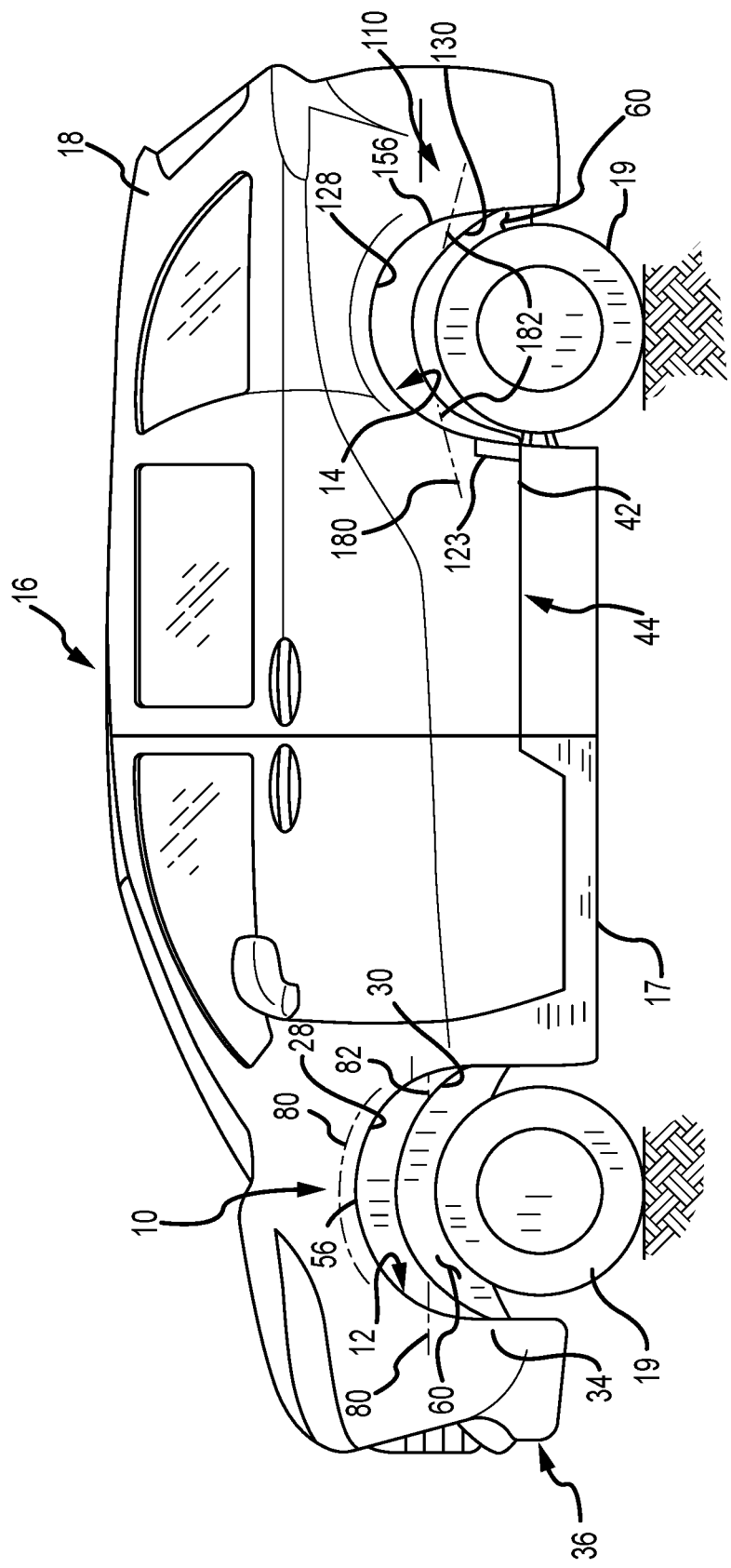
FIG. 1 is a side view of a mobility assist vehicle having fender skirts according to the teachings provided herein mounted to the front and rear wheel openings.
Figure 2:
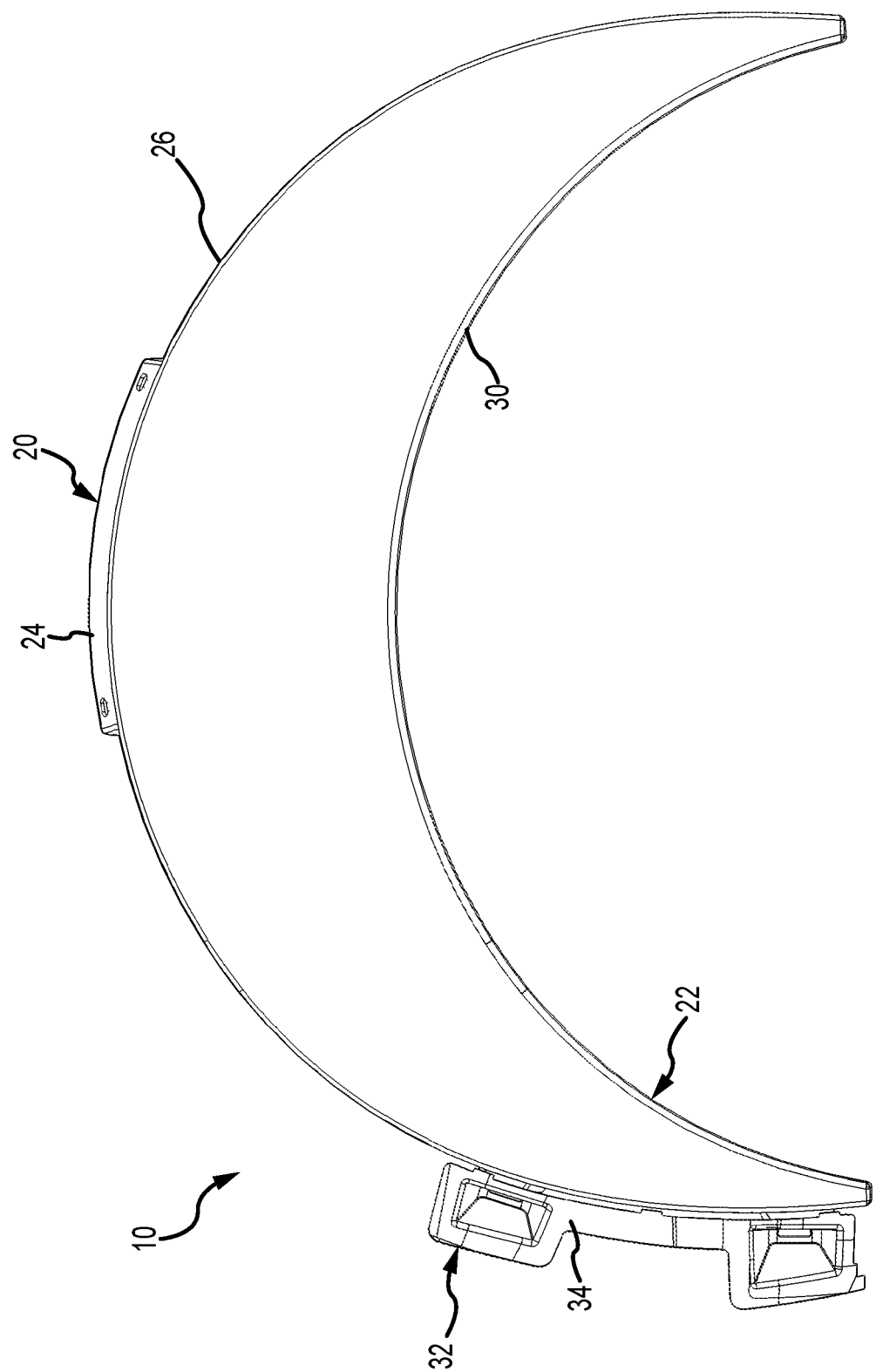
FIG. 2 is a front side view in elevation of a first embodiment of a fender skirt assembly of the present invention configured for use with the front wheel opening of the vehicle illustrated in FIG. 1.

First and second embodiments 10 and 110 of a fender skirt assembly according to the teachings provided herein are illustrated in FIG. 1 as they could be used in respective front and rear wheel openings 12 and 14 of mobility assist vehicle 16. The first and second embodiments 10 and 110 may be referred to in the alternative as front and rear fender skirt assemblies 10 and 110, respectively. Mobility assist vehicle 16 may include a mobility access system, such as a ramp or a lift system (not shown), which may be mounted to a lowered floor assembly 17 of mobility assist vehicle 16. In order to provide the required ground clearance for lowered floor assembly 17, mobility assist vehicle 16 may be provided with a suspension lift system (not specifically shown) to lift or elevate the body 18 of mobility assist vehicle 16 with respect to road wheels 19. The elevated body 18 exposes or reveals substantial portions of the wheel wells 60 and suspension components (not shown) that would otherwise be covered or hidden by the road wheels 19. The front and rear fender skirt assemblies 10 and 110 are mounted to the front and rear wheel openings 12 and 14 of mobility assist vehicle 16 and cover or hide the portions of the wheel wells 60 and suspension components that would otherwise be revealed by the elevated body 18.

Referring now primarily to FIGS. 2-5, the first embodiment 10 of fender skirt assembly may include an inner member 20 and an outer member 22. Inner member 20 may include at least one, and generally a plurality, of mounting lugs 24 that extend generally outwardly therefrom. Mounting lugs 24 allow the inner member 20 to be mounted to the vehicle body 18, generally within the front wheel opening 12. See also FIG. 1. Outer member 22 of fender skirt assembly 10 defines an arcuate upper edge 26 having a curvature that substantially matches a curvature of at least a first upper portion 28 of front wheel opening 12, as best seen in FIG. 1. Outer member 22 of fender skirt 10 also defines an arched lower edge 30. As will be described in further detail below, outer member 22 may be mounted or secured to inner member 20 by means of a suitable adhesive (not shown), although other fastening systems and devices could be used.

Figure 3:
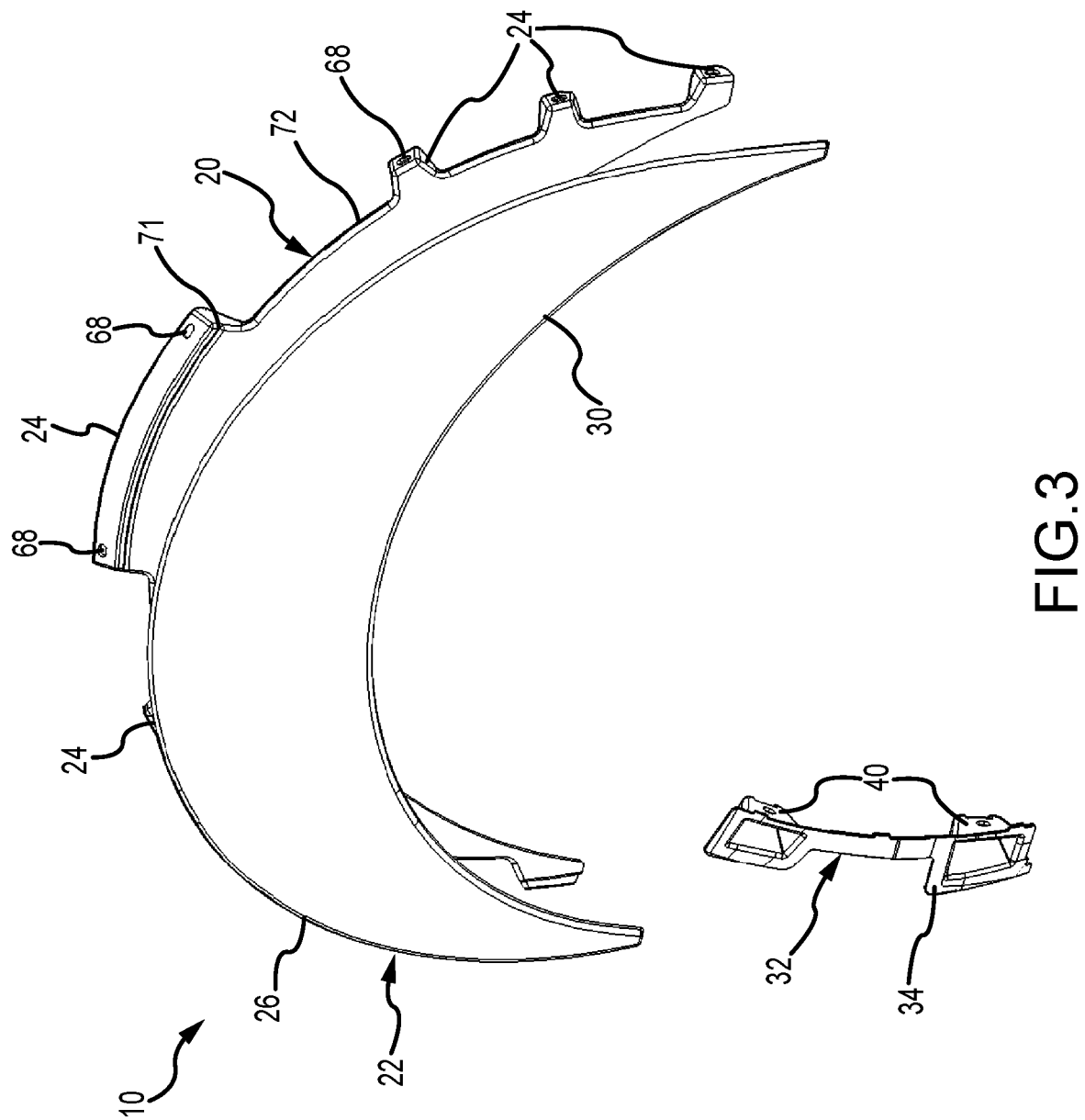
FIG. 3 is an exploded perspective front side view of the first embodiment of the fender skirt assembly showing the outer member, the inner member, and supplemental bracket.
Figure 4:
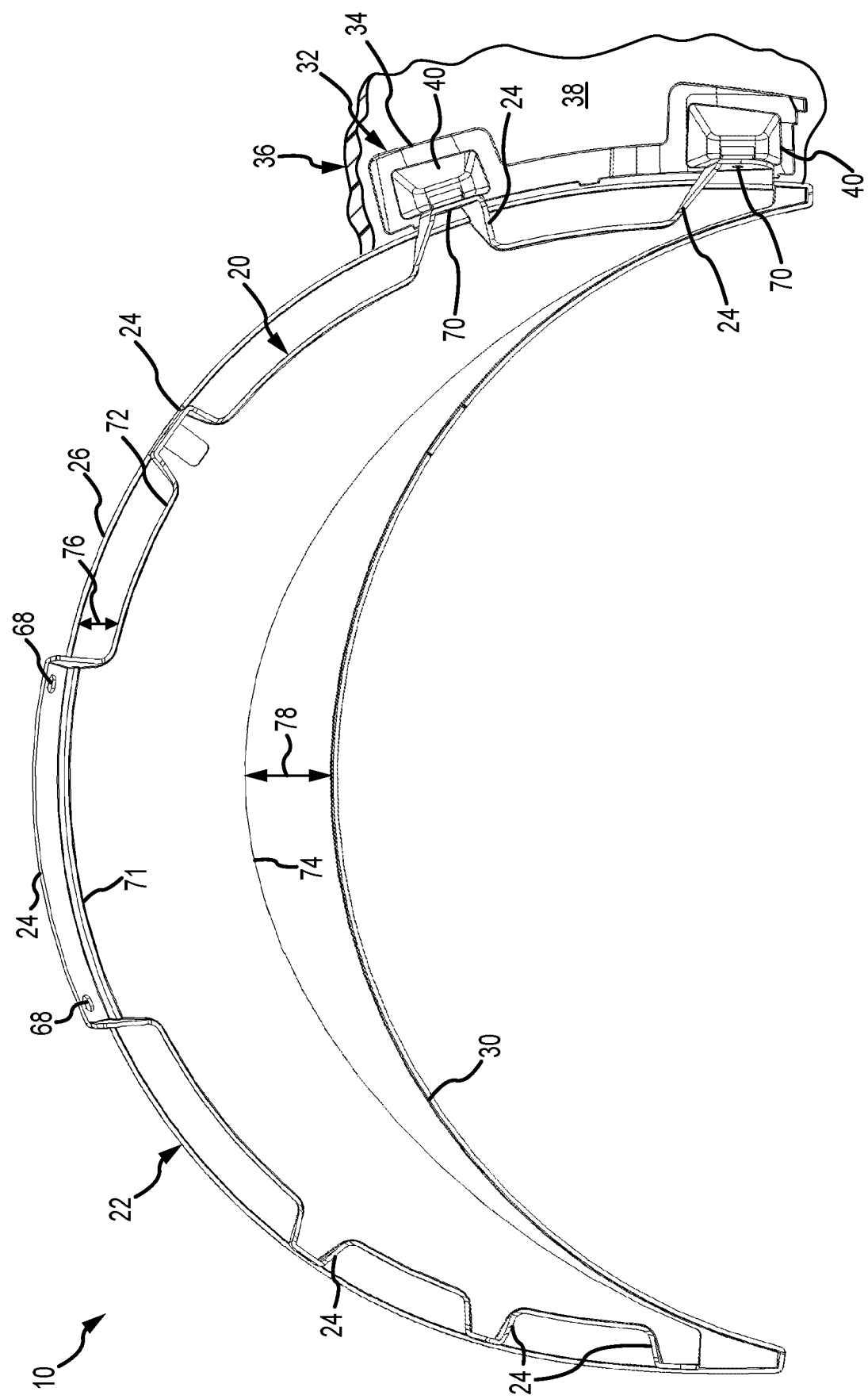
FIG. 4 is a back side view in elevation of the first embodiment of the fender skirt assembly.

With reference now primarily to FIGS. 3 and 4, in some embodiments, fender skirt assembly 10 may also include a supplemental bracket 32 having a mounting flange 34 that extends generally outwardly therefrom. Mounting flange 34 is sized and configured to abut or fit against a vehicle component 36, such as a portion of a bumper or lower cladding 38 of mobility assist vehicle 16. See FIGS. 1 and 4. A suitable adhesive (not shown) may be used to secure mounting flange 34 to vehicle component 36, although other fastening systems and devices could be used. At least one, and generally a plurality, of mounting bosses 40 extending from the supplemental bracket 32 are sized and positioned to align with a corresponding mounting lug or lugs 24 provided on inner member 20, as best seen in FIG. 4. In the particular embodiment shown and described herein, supplemental bracket 32 provides a means for securing the lower portion of inner member 20 within the front wheel opening 12 of vehicle 16.

The second embodiment 110 of fender skirt assembly may be configured to mount to the rear wheel opening 14 of mobility assist vehicle 16. Referring now primarily to FIGS. 6-9, the second embodiment of fender skirt assembly 110 may comprise an inner member 120 and an outer member 122. Inner member 120 may include at least one, and generally a plurality, of mounting lugs 124 that extend generally outwardly therefrom. As was the case for the first embodiment 10, mounting lugs 124 of the second embodiment 110 allow the inner member 120 to be mounted to the vehicle body 18, generally within the rear wheel opening 14.

Outer member 122 of fender skirt 110 defines an arcuate upper edge 126 having a curvature that substantially matches a curvature of at least a first upper portion 128 of rear wheel opening 14, as best seen in FIG. 1. Outer member 122 of fender skirt 110 also defines an arched lower edge 130. In some embodiments, outer member 122 may also be provided with a forward extension or 'wing' 123 that is sized and positioned to match a shape of a lower rear portion 42 of a door opening 44 of mobility assist vehicle 16. Outer member 122 may also be provided with one or more mounting lugs 125. In the particular embodiment shown and described herein, mounting lugs 125 allow the lower rear portion of the outer member 122 to be attached to the rear wheel opening 14 of mobility assist vehicle 16. Outer member 122 may be mounted or secured to inner member 120 by means of a suitable adhesive (not shown). Of course, other fastening systems and devices could be used as would become apparent to persons having ordinary skill in the art after becoming familiar with the teachings provided herein.

As mentioned, the front and rear fender skirt assemblies 10 and 110 may be mounted within the respective front and rear wheel openings 12 and 14 of mobility assist vehicle 16 and thereby hide or cover portions of the wheel wells 60 and suspension systems exposed by the raised body 18. The various mounting lugs 24, 124, and 125 (if mounting lugs 125 are provided) may be secured to portions of the vehicle body 18 that define the respective wheel openings 12 and 14. In one embodiment, at least one, and generally a plurality of the mounting lugs 24, 124, and 125 (if provided) may be attached to existing mounting points in vehicle body 18, such as the mounting points 58 for the existing wheel wells 60. See FIGS. 1, 11, and 12.

Figure 10:
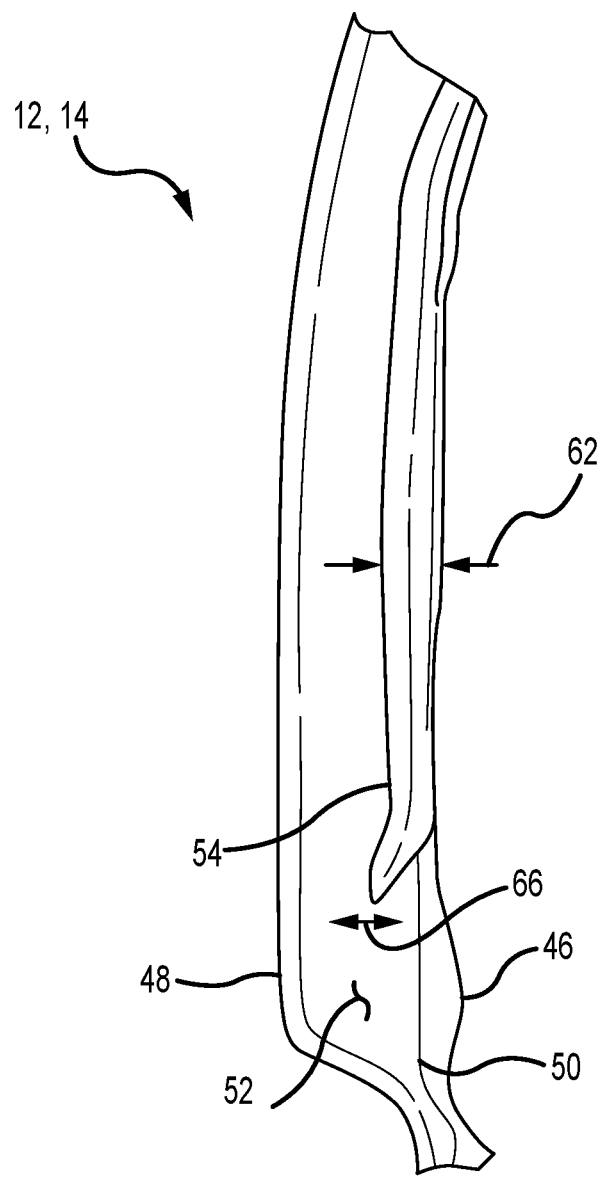
FIG. 10 is an end view of a portion of a vehicle wheel opening with the fender skirt removed to reveal a portion of a caulk bead used to seal a joint between inner and outer body panels.
Figure 11:
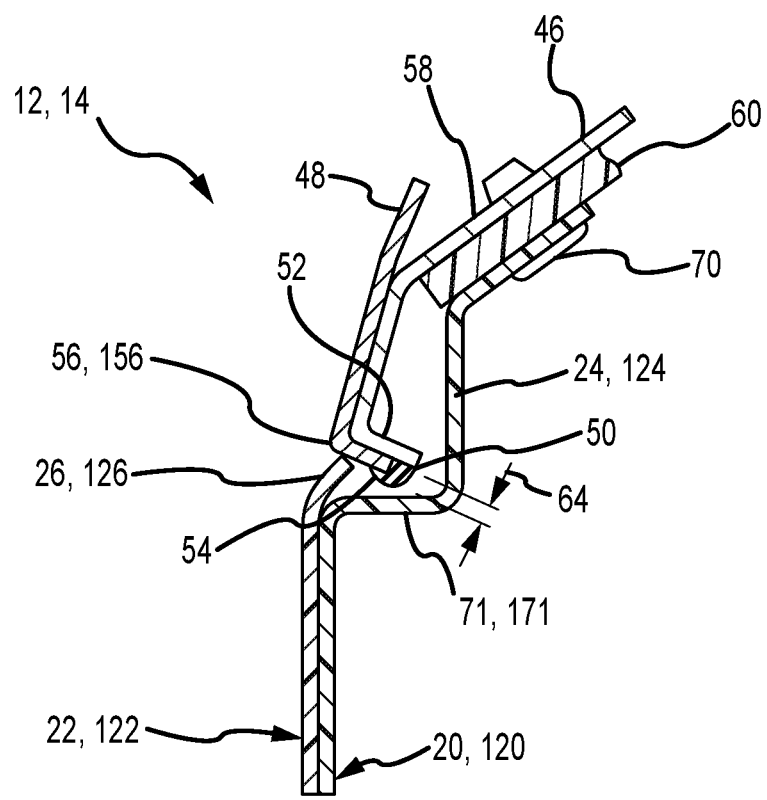
FIG. 11 is a sectional view of a portion of the vehicle wheel opening and fender skirt showing the relative positioning of the various components thereof.
Figure 12:
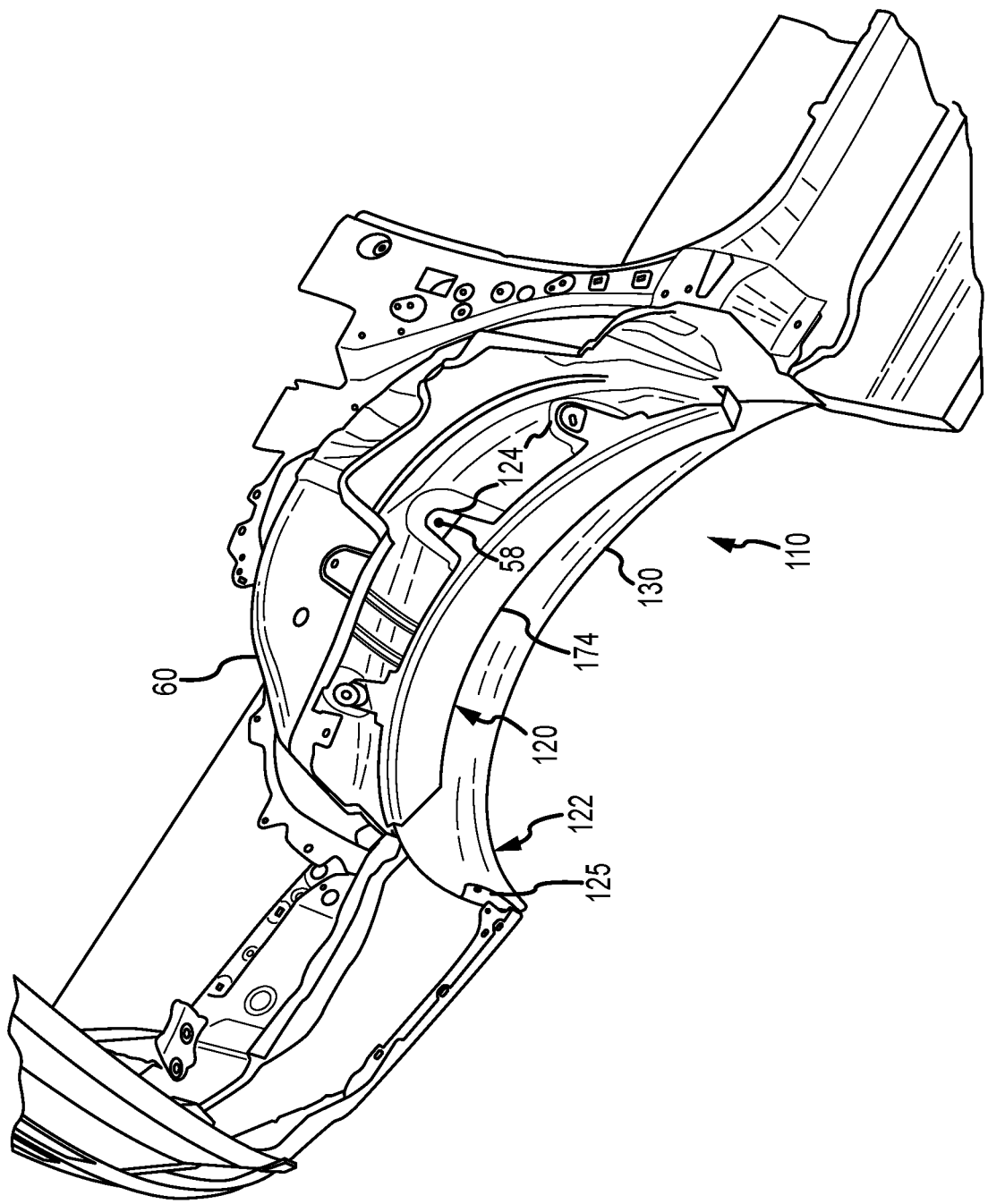
FIG. 12 is an underside perspective view of the rear wheel opening and second embodiment of the fender skirt shown in the installed position.

Referring now primarily to FIGS. 10 and 11, in most vehicles the respective wheel openings 12 and 14 are defined by inner and outer body panels 46 and 48 that are brought together to form a joint 50. Joint 50 may be formed or bent over to form a flange 52 that defines the wheel opening, i.e., either the front or rear wheel opening 12 or 14, as the case may be. The joint 50 between the inner and outer body panels 46 and 48 is typically sealed by one or more caulk beads 54 to prevent foreign materials, such as water, road salt, or dust, from entering joint 50. In most instances, caulk bead 54 will exhibit variations in width 62, height or thickness 64 (FIG. 11), and lateral positioning 66 with respect to joint 50, all of which create variations in the wheel openings 12 and 14 that have the potential to interfere with the fit of fender skirts 10, 110. However, the inner and outer members 20, 22, 120, and 122 of fender skirts 10, 110 accommodate variations in the caulk bead 54, thereby allowing the upper edges 26, 126 of fender skirts 10, 110 to form uniform joints or panel gaps 56, 156 between outer members 22, 122, and the upper portions 28 and 128 of respective wheel openings 12 and 14, as best seen in FIGS. 1 and 11.

A significant advantage of the fender skirt assemblies according to the present invention is that they may be used to cover or hide portions of the wheel wells and suspension assemblies that are exposed by the raised body of the mobility assist vehicle, thereby improving vehicle aesthetics. In addition, the fender skirt assemblies 10, 110 reduce the aerodynamic drag coefficient of the vehicle 16 compared to what it would otherwise be without the fender skirts. The reduced aerodynamic drag coefficient will typically result in improved vehicle fuel economy, particularly at highway speeds. The improved aerodynamics associated with the use of the fender skirt assemblies 10, 110 will also typically result in reduced wind noise, again particularly at highway speeds.

Still other advantages are associated with the inner and outer members 20, 120, 22, and 122 of fender skirt assemblies 10 and 110. First, the inner and outer members accommodate variations of the caulk beads that commonly seal the joint between the inner and outer body panels forming the wheel opening. Therefore, there is no need to remove the existing caulk nor re-caulk the joint before installing the fender skirts. Besides reducing the time and expense of the conversion process, the ability to accommodate variations of the existing caulk beads allows the upper portions of the outer members to form a highly uniform joints or panel lines between the fender skirt assemblies and the wheel openings.

Still yet other advantages of two piece construction of the fender skirt assemblies is that the inner and outer members reinforce and strengthen one another, thereby reducing the tendency of the fender skirt assemblies to rattle or vibrate during vehicle travel, particularly in response to aerodynamic loads. The additional strength and rigidity of the two-piece design also reduces the tendency either member to develop cracks or even fracture over time, which can be a significant advantage where the components of the fender skirts are made from thermoplastic materials.

Having briefly described the fender skirt assemblies according to the present invention, as well as some of their more significant features and advantages, various embodiments and alternative configurations of the fender skirt assemblies will now be described in detail. However, before proceeding with the description, it should be noted that while the fender skirt assemblies are shown and described herein as they could be used in conjunction with a mobility assist vehicle made from an OEM minivan type of vehicle, the present invention could be used in conjunction with any type of vehicle, regardless of whether the vehicle is a mobility assist vehicle. Therefore, the present invention should not be regarded as limited to the particular vehicle types and applications shown and described herein.

Referring back now to FIG. 1, first and second embodiments 10 and 110 of the fender skirt assembly according to the teachings provided herein are shown mounted to respective front and rear wheel openings 12 and 14 of mobility assist vehicle 16. The first embodiment 10 of the fender skirt assembly is best seen in FIGS. 2-5 and includes an inner member 20 and an outer member 22. Inner member 20 comprises a generally plate-like member having one or more mounting lugs 24 extending generally outwardly therefrom. As will be described in greater detail below, the mounting lugs 24 may be sized and spaced to align with existing mounting points 58 (FIGS. 11 and 12) provided within the wheel opening 12. In one embodiment, mounting points 58 may be those mounting points that are used to secure or mount the wheel well 60 within front wheel opening 12. Alternatively, of course, the mounting points 58 could be made specifically for the particular inner member 20, in which case the various mounting lugs 24 could be provided with any convenient spacing. In an embodiment wherein the mounting lugs 24 are sized and spaced to align with existing mounting points 58, mounting lugs 24 may be provided with respective openings 68 therein sized to receive corresponding fasteners 70, as best seen in FIG. 11. Fasteners 70 may comprise any of a wide range of fasteners, such as screws or rivets, suitable for the particular application and vehicle involved. By way of example, in one embodiment, fasteners 70 may comprise the same type of fastener used to secure the wheel well assembly 60 within the wheel opening 12.

Inner member 20 may define an arcuate top edge 72 and an arched bottom edge 74, as best seen in FIG. 4. In one embodiment, the curvature of the arcuate top edge 72 is smaller (i.e., on a radial basis) than the curvature of the arcuate upper edge 26 of outer member 22 so that the top edge 72 of inner member 20 is offset from the arcuate upper edge 26 of the outer member 22 by an upper offset distance 76. In one embodiment, the upper offset distance 76 may be substantially uniform, as best seen in FIG. 4. Alternatively, the upper offset distance 76 could vary along the length of the arcuate top edge 72 of inner member 20. The arched bottom edge 74 of inner member 20 may have a curvature that is also smaller (i.e., on a radial basis) than the curvature of the arched lower edge 30 of outer member 22 so that the bottom edge 74 of inner member 20 is offset from the arched lower edge 30 of outer member 22 by a lower offset distance 78. In the particular embodiment shown and described herein, the lower offset distance 78 is not uniform, but is greatest at about the top portion of arched lower edge 30 of outer member 22, gradually tapering to a lower offset near the lower ends of outer member 22, as best seen in FIG. 4. Alternatively, of course, the lower offset distance 78 could be substantially uniform, or could vary in another manner, as would become apparent to persons having ordinary skill in the art after becoming familiar with the teachings provided herein.

In some embodiments, the inner member 20 is provided with a stepped flange section 71 that is sized to receive the body panel flange 52 and caulk bead 54 within wheel opening 12. See FIGS. 3, 5, and 11. The various mounting lugs 24 may then extend generally outwardly from the stepped flange section 71. Of course, those portions of the arcuate top edge 72 of inner member 22 that are displaced from the upper edge 26 of outer member 22 (i.e., by the upper displacement distance 76), need not be provided with stepped flanges as they will not interfere with the body panel flange 52 and caulk bead 54.

Inner member 20 may be fabricated from any of a wide range of materials, such as metals or plastics, now known in the art or that may be developed in the future that are, or would be, suitable for the particular application. By way of example, in one embodiment, inner member 20 is fabricated from a thermoform plastic material. Suitable thermoform plastic materials include, but are not limited to, acrylonitrile butadiene styrene (ABS), high-density polyethylene (HDPE), polyvinyl chloride (PVC), and polyethylene terephthalate (PET).

Outer member 22 of front fender skirt assembly 10 may comprise a plate-like member having an arcuate upper edge 26 and an arched lower edge 30. Before proceeding with the description, it should be noted that, as used herein, the terms "plate-like" or "generally plate-like" should not be regarded as referring solely to a flat or planar structure, although they could. Instead, the terms may include or permit some curvature of both the inner and outer members 20 and 22 (as well as members 120 and 122), as may be required or desired to conform to the curvatures of the body panels of the particular vehicle. In most instances, the inner and outer members 20 and 22 will have some curvature, either simple (i.e., along a single axis) or compound (i.e., along multiple axes) to conform or create a smooth transition to the body panels and wheel openings of the particular vehicle.

Proceeding now with the description, the arcuate upper edge 26 of outer member 22 has a curvature that substantially matches the curvature of a first upper portion 28 of the front wheel opening 12, as best seen in FIG. 1. So matching the curvature of the arcuate upper edge 26 of outer member 22 to the curvature of the front wheel opening 12 will allow the fender skirt assembly 10 to define a uniform gap or panel line 56 between outer member 22 and wheel opening 12. See also FIG. 11. The arched lower edge 30 of outer member 22 may have any desired curvature. In one embodiment, the arched lower edge 30 of outer member 22 has a curvature that is smaller (i.e., on a radial basis) than the curvature of the upper portion 28 of wheel opening 12. Alternatively, the arched lower edge 30 could have curvatures that are about the same or even larger (again on a radial basis) than the curvature of the upper portion 28 of wheel opening 12.

If the body 18 of mobility assist vehicle 16 is provided with an ornamental contour, e.g., one or more crease lines 80, near the front wheel opening 12, then outer member 22 may be provided with a similar ornamental contour, e.g., crease line(s) 82, to harmonize the appearance of the fender skirt 10 with the body 18 of mobility assist vehicle 16. Since the particular ornamental contours will vary from vehicle-to-vehicle, the outer member 22 should not be regarded as limited to any particular ornamental contour.

Outer member 22 may be fabricated from any of a wide range of materials, such as metals or plastics, that are now known in the art or that may be developed in the future that are, or would be, suitable for the particular application. By way of example, in one embodiment, outer member 22 is fabricated from the same thermoform plastic material, e.g., ABS, HDPE, PVC, or PET, as inner member 20. Of course, if the outer member 22 is to be painted to match the paint on the body 18 of vehicle 16, then the material selected for outer member 22 should be compatible with the particular paint formulation that is to be used. Alternatively, the particular paint formulation may be selected to be compatible with the particular material used to fabricate outer member 22.

Inner and outer members 20 and 22 may be mounted together to form a unitary structure. In one embodiment, the inner and outer members 20 and 22 are secured together by means of an adhesive suitable for the particular materials used to fabricate the inner and outer members 20 and 22. Alternatively, other types of fastening systems could be used.

Figure 5:
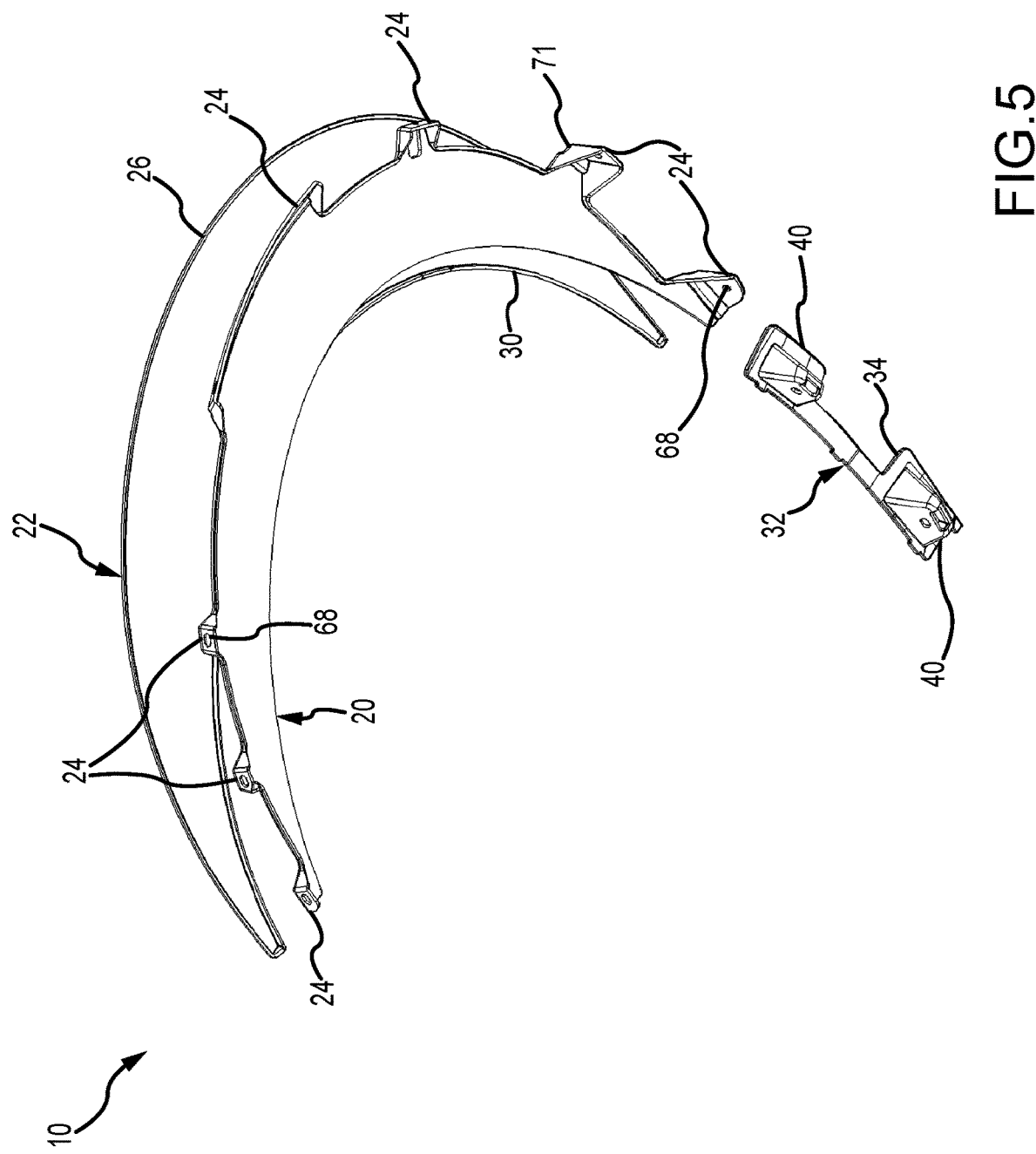
FIG. 5 is an exploded perspective back side view of the first embodiment of the fender skirt assembly.
Figure 6:
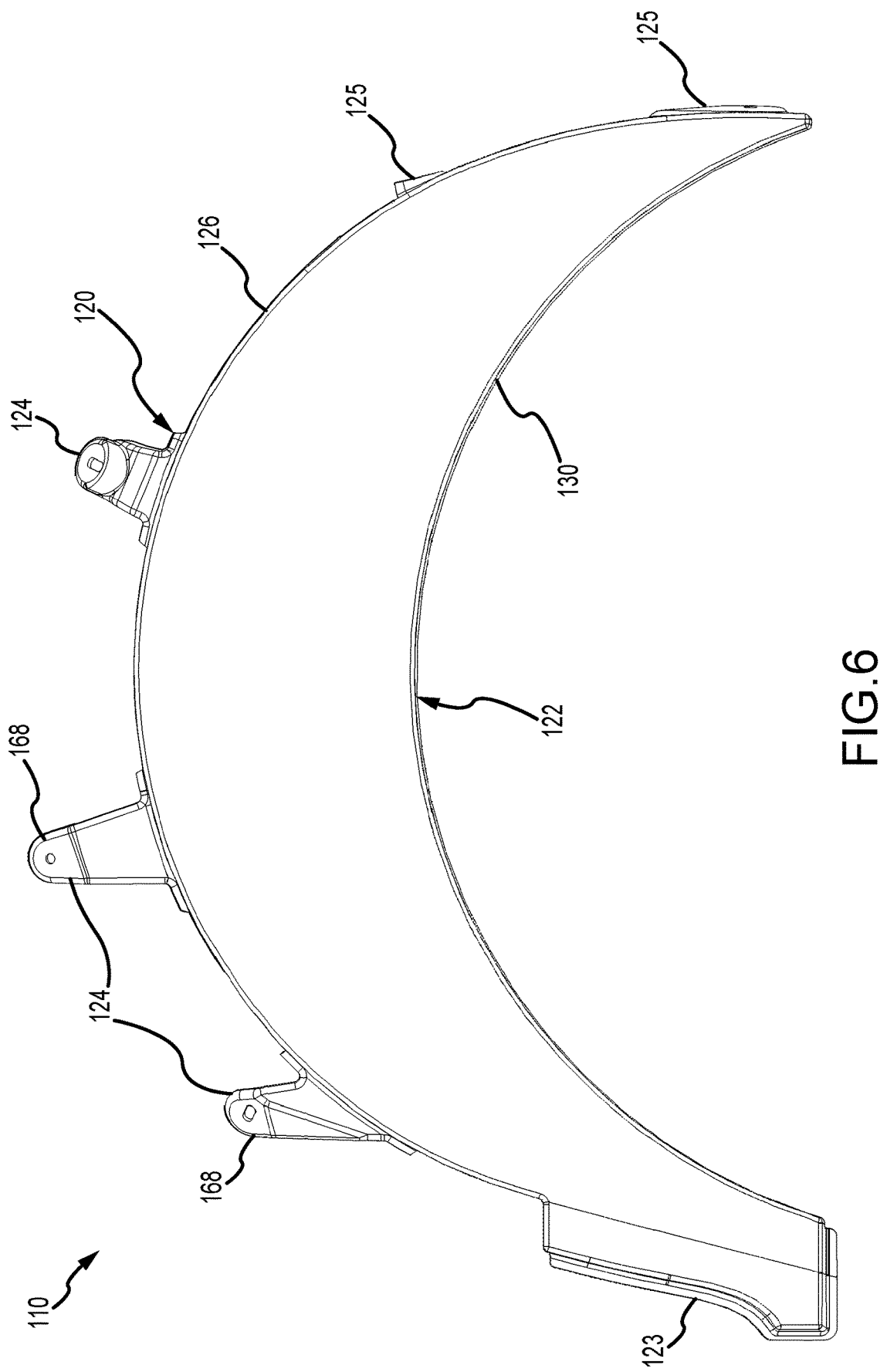
FIG. 6 is a front side view in elevation of a second embodiment of a fender skirt assembly of the present invention configured for use with the rear wheel opening of the vehicle illustrated in FIG. 1.
Figure 7:
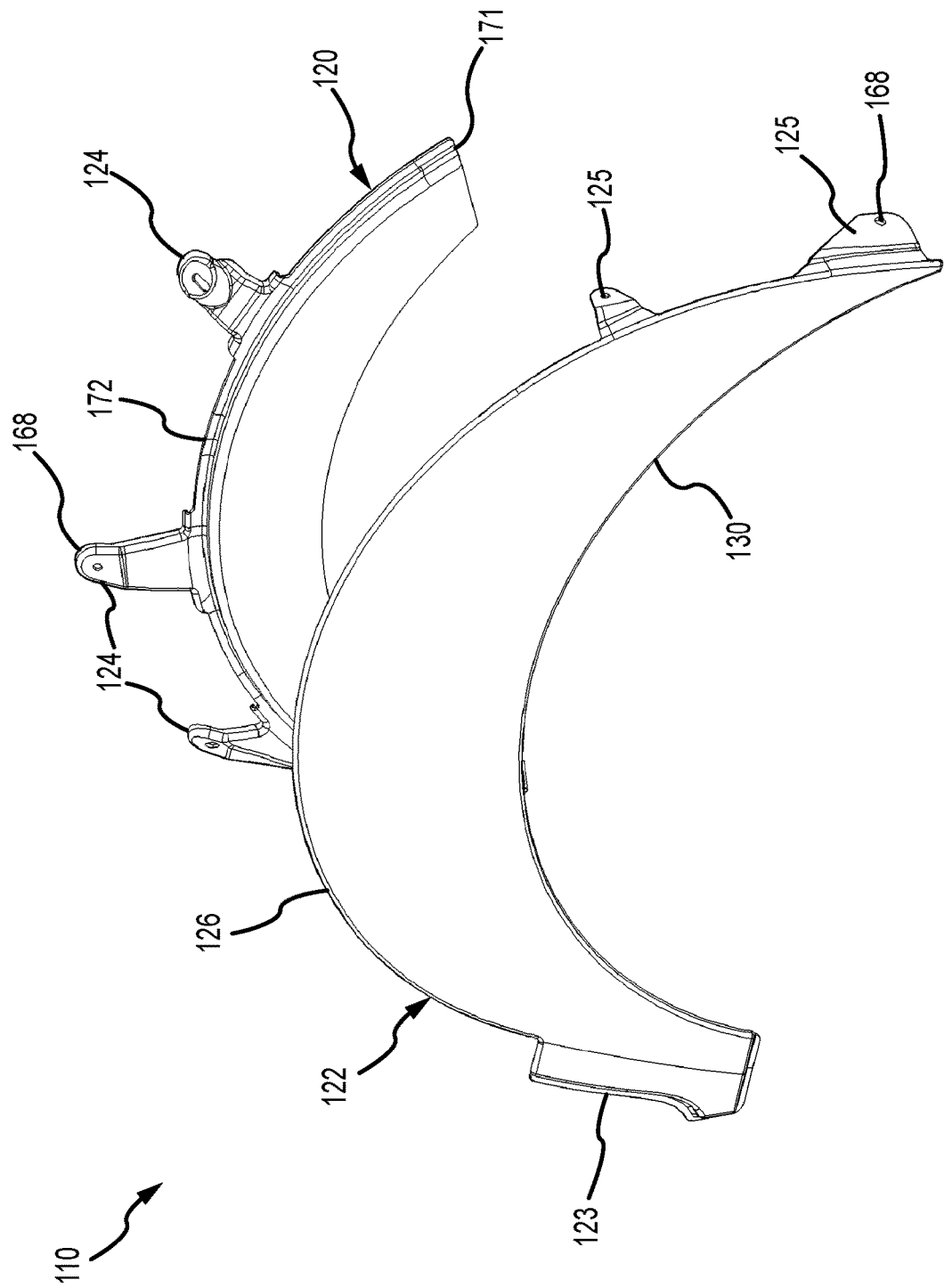
FIG. 7 is an exploded perspective front side view of the second embodiment of the fender skirt assembly showing the outer and inner members.

As briefly mentioned earlier, and depending on the configuration of the front wheel opening 12 of the particular mobility assist vehicle 16, front fender skirt assembly 10 may also be provided with a supplemental mounting bracket 32. Supplemental mounting bracket 32 may be used to provide an additional attachment point for the forward, lower portion of the inner member 20. Referring now primarily to FIGS. 4 and 5, supplemental bracket 32 may have a mounting flange 34 that extends generally outwardly therefrom that is sized and configured to abut a vehicle component 36, such as a portion of a bumper or lower body cladding 38 near the lower front portion of the front wheel opening 12. See also FIG. 1. The mounting flange 34 may be attached or mounted to the vehicle component 36 to provide a secure mount for supplemental bracket 32. In one embodiment, the vehicle component 36 comprises a portion of a plastic bumper assembly of vehicle 16. A suitable adhesive (not shown) may be used to attach or adhere the mounting flange 34 to the bumper assembly. See also FIG. 4.

Supplemental mounting bracket 32 may also be provided with one or more mounting bosses 40 that are sized and positioned to align with corresponding mounting lugs 24 provided on inner member 20, as best seen in FIG. 4. Suitable fasteners, such as screws or rivets (not shown), may be used to attach the mounting lugs 24 to the mounting bosses 40.

The second embodiment 110 of fender skirt assembly is similar to the first embodiment 10 already described. However, the second embodiment 110 differs in certain respects because it is configured to mount to the rear wheel opening 14 of mobility assist vehicle 16.

Referring now to FIGS. 6-9, the second or rear fender skirt assembly 110 includes an inner member 120 and an outer member 122. Inner member 120 comprises a generally plate-like member having one or more mounting lugs 124 that extend generally outwardly therefrom. The mounting lugs 124 may be sized and spaced to align with existing mounting points 58 (FIGS. 1 and 12) provided within the rear wheel opening 14. Mounting points 58 may be those mounting points used to secure the wheel well 60 within rear wheel opening 14. Alternatively, custom mounting points could be used, in which case the various mounting lugs 124 could be provided with any convenient spacing along inner member 120. In an embodiment wherein the mounting lugs 124 are sized and spaced to align with existing mounting points 58, mounting lugs 124 may be provided with respective openings or holes 168 therein sized to receive corresponding fasteners 70. See FIG. 11. As was the case for the first embodiment 10 of fender skirt assembly, fasteners 70 may comprise any of a wide range of fasteners, such as screws or rivets, suitable for the particular application. By way of example, in one embodiment, fasteners 70 may comprise the same type of fastener used to secure the wheel well assembly 60 within the rear wheel opening 14.

Figure 8:
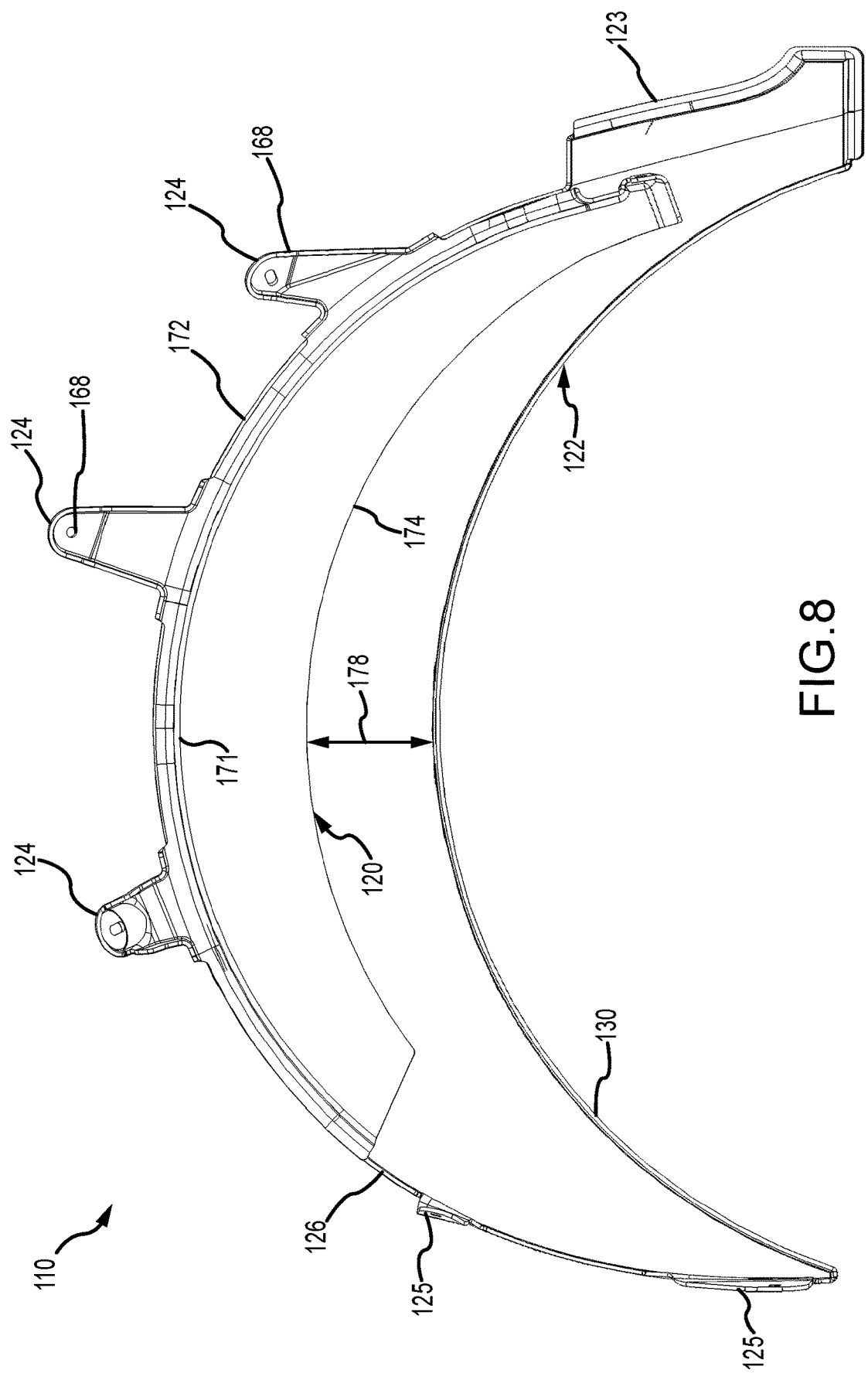
FIG. 8 is a back side view in elevation of the second embodiment of the fender skirt assembly.
Figure 9:
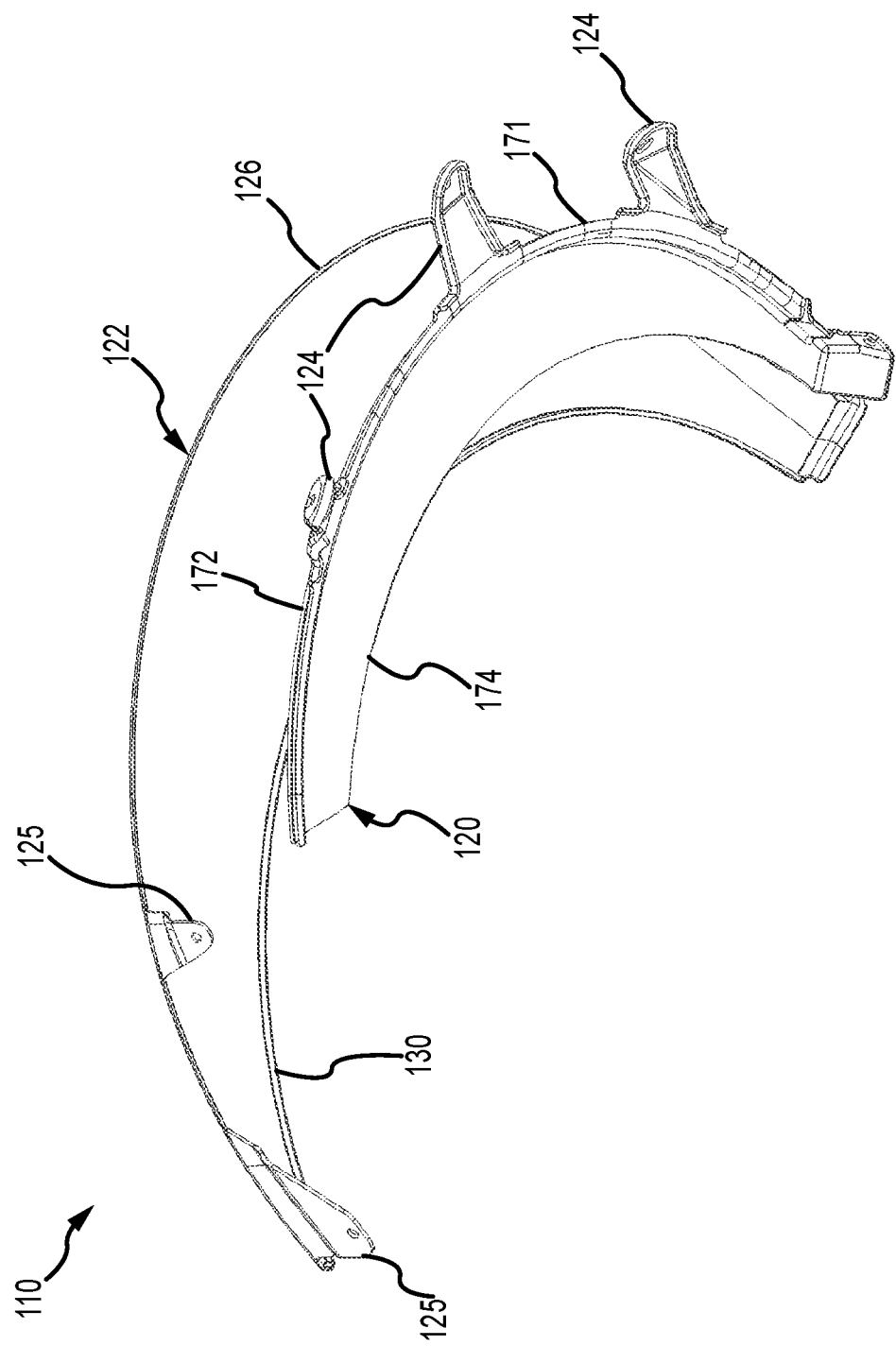
FIG. 9 is an exploded perspective back side view of the second embodiment of the fender skirt assembly.

Inner member 120 may define an arcuate top edge 172 and an arched bottom edge 174, as best seen in FIGS. 8 and 9. In one embodiment, the curvature of the arcuate top edge 172 is about the same as the curvature of the arcuate upper edge 126 of outer member 122, as best seen in FIG. 8. That is, and unlike the first embodiment 10, the top edge 172 of inner member 120 is not offset from the arcuate upper edge 126 of the outer member 122, other than that provided by the stepped flange section 171, described below. The arched bottom edge 174 of inner member 120 may have a curvature that is about the same as (i.e., on a radial basis) the curvature of the arched lower edge 130 of outer member 122. The arrangement is such that the bottom edge 174 of inner member 120 is offset from the arched lower edge 130 of outer member 122 by a lower offset distance 178. In the particular embodiment shown and described herein, the lower offset distance 178 is not uniform, but is greatest at about the top portion of arched lower edge 130 of outer member 122, gradually tapering to a smaller distance near the forward lower ends of outer member 122, again as best seen in FIG. 8.

As was the case for the first embodiment 10, in some embodiments of the rear fender skirt 110 the inner member 120 is provided with a stepped flange section 171 that is sized to receive the body panel flange 52 and caulk bead 54 within rear wheel opening 14. See FIGS. 7, 8, 9, and 11. The various mounting lugs 124 will then extend generally outwardly from the stepped flange section 171.

Inner member 120 may be fabricated from any of a wide range of materials, such as metals or plastics, that are now known in the art or that may be developed in the future that are, or would be, suitable for the particular application. By way of example, in one embodiment, inner member 120 is fabricated from a thermoform plastic material, such as, for example, ABS, HDPE, PVC, or PET.

As was the case for outer member 22 of the front fender skirt assembly 10, outer member 122 of rear fender skirt assembly 110 may comprise a plate-like member having an arcuate upper edge 126 and an arched lower edge 130. The arcuate upper edge 126 of outer member 122 has a curvature that substantially matches the curvature of a first upper portion 128 of rear wheel opening 14. See FIG. 1. So matching the curvature of the arcuate upper edge 126 of outer member 122 to the curvature of the rear wheel opening 14 will allow the fender skirt assembly 110 to define a uniform gap or panel line 156 between outer member 122 and wheel opening 14, as best seen in FIGS. 1 and 1*i*1. The arched lower edge 130 of outer member 122 may have any desired curvature. In one embodiment, the arched lower edge 130 of outer member 122 has a curvature that is smaller (i.e., on a radial basis) than the curvature of the upper portion 128 of wheel opening 14.

In the particular embodiment shown and described herein, outer member 122 may also be provided with a forward extension or 'wing' 123 that is sized and positioned to match a shape of a lower rear portion 42 of a door opening 44 of mobility assist vehicle 16. See FIGS. 1, 6, and 7. Outer member 122 may also be provided with one or more mounting lugs 125. In the particular embodiment shown and described herein, mounting lugs 125 allow the lower rear portion of the outer member 122 to be attached to the rear wheel opening 14 of mobility assist vehicle 16. If used, each mounting lug 125 may define an opening 168 therein sized to receive a suitable fastener 70.

If the body 18 of mobility assist vehicle 16 is provided with an ornamental contour, e.g., one or more crease lines 180, near the rear wheel opening 14, then outer member 122 may be provided with a similar ornamental contour, e.g., crease line(s) 182, to harmonize the appearance of rear fender skirt 110 with the body 18.

Outer member 122 may be fabricated from any of a wide range of materials, such as metals or plastics, that are now known in the art or that may be developed in the future that are, or would be, suitable for the particular application. By way of example, in one embodiment, outer member 122 may be fabricated from the same thermoform plastic material, e.g., ABS, HDPE, PVC, or PET, as inner member 120. If outer member 122 is to be painted to match the paint on the body 18 of vehicle 16, then the material used to fabricate outer member 122 should be compatible with the particular paint that is to be used.

As was the case for the first embodiment 10, the inner and outer members 120 and 122 of the rear fender skirt assembly 110 are mounted together to form a unitary structure. In one embodiment, the inner and outer members 120 and 122 are secured together by means of an adhesive suitable for the particular materials used to fabricate the inner and outer members 120 and 122. Alternatively, other fastening systems and devices could be used, as would become apparent to persons having ordinary skill in the art after becoming familiar with the teachings provided herein.

The front and rear fender skirt assemblies 10 and 110 may be attached to the respective front and rear wheel wells 12 and 14 of vehicle 16 in order to cover or hide exposed portions of the wheel wells 60 and suspension components exposed by the raised body 18. The front fender skirt assembly 10 may be attached to the front wheel opening 12 by removing the fasteners used to secure the wheel well 60 in place. The various mounting lugs 24 may then be aligned with the corresponding mounting points 58. Fasteners 70 may then be used to secure the mounting lugs 24 and wheel well 60 within the front wheel opening 12. See also FIG. 11. In an embodiment having a supplemental mounting bracket 32, the mounting flange 34 may be secured to the appropriate vehicle component 36, e.g., an inside portion of a front bumper or lower body cladding. A suitable adhesive may be used to secure the mounting flange to the vehicle component 36. Thereafter, the mounting lugs 24 on inner member may be mounted or secured to mounting bosses 40 provided on supplemental bracket 32 by suitable fasteners 70. See FIG. 4.

The rear fender skirt assembly 110 may be attached to the rear wheel opening 14 in a similar manner. That is, the various fasteners used to secure the wheel well 60 first may be removed. The various mounting lugs 124 and 125 (if provided) may be aligned with the corresponding mounting points 58. Fasteners 70 may then be used to secure the mounting lugs 124 and wheel well 60 within the rear wheel opening 12. See FIGS. 11 and 12. Both the front and rear fender skirt assemblies 10 and 110 will provide clearance for the flange 52 and caulk bead 54 that define the wheel openings 12 and 14, as best seen in FIG. 11.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. In a vehicle having a body lift system that raises a body of said vehicle to an elevated position and increases exposed portions of respective left and right front and left and right rear wheel wells defined between respective left and right front and left and right rear wheel openings and respective left and right front and left and right rear road wheels of said vehicle, the improvement comprising:

a left front fender skirt mounted to the left front wheel opening of said vehicle, the left front fender skirt reducing the exposed portion of the left front wheel well of said vehicle and reducing an aerodynamic drag coefficient of said vehicle;
a right front fender skirt mounted to the right front wheel opening of the vehicle, the right front fender skirt reducing the exposed portion of the right front wheel well of said vehicle and reducing the aerodynamic drag coefficient of said vehicle;
a left rear fender skirt mounted to the left rear wheel opening of the vehicle, the left rear fender skirt reducing the exposed portion of the left rear wheel well of said vehicle and reducing the aerodynamic drag coefficient of the vehicle;
a right rear fender skirt mounted to the right rear wheel opening of the vehicle, the right rear fender skirt reducing the exposed portion of the right rear wheel well of said vehicle and reducing the aerodynamic drag coefficient of the vehicle;
wherein each of said left and right front fender skirts and each of said left and right rear fender skirts further comprises:
an inner member having a top portion that defines a stepped flange section and at least one mounting lug extending from the stepped flange section; and
an outer member mounted to said inner member, said outer member defining an arcuate upper portion shaped to substantially match a curvature of at least a first upper portion of the respective right and left front and right and left rear wheel openings in the vehicle, said outer member also defining an arched lower portion, the stepped flange section of said inner member and said outer member defining a cavity sized to receive a body panel flange defining the wheel opening in the vehicle.

2. A vehicle, comprising:
a body lift system, said body lift system raising a body of said vehicle to an elevated position, said body lift system increasing exposed portions of left and right front wheel wells defined between respective left and right front wheel openings of said vehicle and respective left and right road wheels of said vehicle, said body lift system also increasing exposed portions of left and right rear wheel wells defined between respective left and right rear wheel openings of said vehicle and respective left and right rear road wheels of said vehicle;
a left front fender skirt mounted to the left front wheel opening of said vehicle, the left front fender skirt reducing the exposed portion of the left front wheel well and reducing an aerodynamic drag coefficient of the vehicle;
a right front fender skirt mounted to the right front wheel opening of the vehicle, the right front fender skirt reducing the exposed portion of the right front wheel well and reducing the aerodynamic drag coefficient of the vehicle;
a left rear fender skirt mounted to the left rear wheel opening of the vehicle, the left rear fender skirt reducing the exposed portion of the left rear wheel well and reducing the aerodynamic drag coefficient of the vehicle; and
a right rear fender skirt mounted to the right rear wheel opening of the vehicle, the right rear fender skirt reducing the exposed portion of the right rear wheel well and reducing the aerodynamic drag coefficient of the vehicle.

3. The vehicle of claim 2, wherein each of said left and right front fender skirts and each of said left and right rear fender skirts further comprises:
an inner member;
at least one mounting lug provided on said inner member; and
an outer member mounted to said inner member, said outer member defining an arcuate upper edge having a curvature that substantially matches a curvature of at least a first upper portion of the respective right and left front and right and left rear wheel openings in the vehicle, said outer member also defining an arched lower edge.

4. The vehicle of claim 2, wherein each of said left and right front fender skirts and each of said left and right rear fender skirts further comprises:
an inner member having a top portion that defines a stepped flange section and at least one mounting lug extending from the stepped flange section; and
an outer member mounted to said inner member, said outer member defining an arcuate upper portion shaped to substantially match a curvature of at least a first upper portion of the respective right and left front and right and left rear wheel openings in the vehicle, said outer member also defining an arched lower portion, the stepped flange section of said inner member and said outer member defining a cavity sized to receive a body panel flange defining the wheel opening in the vehicle.

5. A fender skirt for a vehicle, comprising:
an inner member, said inner member having a top portion that defines a stepped flange section, said inner member having at least one mounting lug provided thereon, said inner member also defining a bottom portion; and
an outer member mounted to said inner member, said outer member defining an arcuate upper portion shaped to substantially match a curvature of at least a first upper portion of a wheel opening in the vehicle, said outer member also defining an arched lower portion, the stepped flange section of said inner member and said outer member defining a cavity sized to receive a body panel flange defining the wheel opening in the vehicle.

6. The fender skirt of claim 5, wherein the body panel flange defining the wheel opening in the vehicle includes a caulk bead and wherein the cavity defined by the stepped flange section of said inner member and said outer member is sized to receive the body panel flange and the caulk bead.

7. The fender skirt of claim 5, further comprising a supplemental bracket, said supplemental bracket, comprising:
a mounting flange provided on said supplemental bracket so that said mounting flange abuts a surface of a component of the vehicle; and
a mounting boss provided on said supplemental bracket, said mounting boss being mounted to said inner member.

8. The fender skirt of claim 5, wherein a body panel of the vehicle defines at least one ornamental contour thereon and wherein said outer member defines at least one ornamental contour that will be in substantial alignment with the contour defined by the body panel of the vehicle when said fender skirt is mounted to the vehicle.

9. The fender skirt of claim 8, wherein the ornamental contour defined by the body panel of the vehicle comprises a crease line on a fender of the vehicle and wherein the at least one contour defined by said outer member comprises a crease line that will be in substantial alignment with the crease line on the fender of the vehicle when said fender skirt is mounted to the vehicle.

10. The fender skirt of claim 5, wherein said mounting lug defines at least one opening therein sized to receive a fastener.

11. The fender skirt of claim 5, further comprising at least one mounting lug provided on said outer member.

12. The fender skirt of claim 5, wherein a forward portion of the arcuate upper edge of said outer member includes an extension wing sized to match a shape of a lower rear portion of a door opening of the vehicle.

13. The fender skirt of claim 5, wherein said inner and outer members comprise a thermoform plastic material.

14. The fender skirt of claim 13, said thermoform plastic material comprises one or more consisting of acrylonitrile butadiene styrene (ABS), high density polyethylene (HDPE), polyvinyl chloride (PVC), and polyethylene terephthalate (PET).

15. A method of mounting a fender skirt to a wheel opening of a vehicle, comprising:
- providing a fender skirt assembly comprising an inner member having at least one mounting lug provided thereon and an outer member attached to the inner member, the outer member defining an upper edge having a curvature that is about the same as a curvature of a first upper portion of the wheel opening of the vehicle;
- removing at least one wheel well fastener from a mounting point provided within the wheel well of the vehicle;
- positioning the fender skirt assembly adjacent the wheel well;
- aligning the mounting lug on the fender skirt assembly with the mounting point; and
- installing a fastener in the mounting point, the fastener securing the fender skirt assembly and wheel well within the wheel opening of the vehicle.

* * * * *